(12) United States Patent
Shen et al.

(10) Patent No.: US 11,669,732 B2
(45) Date of Patent: Jun. 6, 2023

(54) NEURAL NETWORK QUANTIZATION METHOD, DEVICE AND RELATED PRODUCTS

(71) Applicant: Cambricon Technologies Corporation Limited, Beijing (CN)

(72) Inventors: Yubin Shen, Beijing (CN); Zhibin Guo, Beijing (CN); Xinkai Song, Beijing (CN); Shaoli Liu, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 602 days.

(21) Appl. No.: 16/711,376

(22) Filed: Dec. 11, 2019

(65) Prior Publication Data

US 2020/0210830 A1 Jul. 2, 2020

(30) Foreign Application Priority Data

Dec. 29, 2018 (CN) .......................... 201811654179.7

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
CPC .......... G06N 3/08; G06N 3/04; G06N 3/0454; G06N 20/00; G06N 3/02; G06F 2207/4824

USPC .......................................................... 707/756
See application file for complete search history.

(56) References Cited

U.S. PATENT DOCUMENTS

| 2018/0046896 | A1* | 2/2018 | Yu ........................ G06N 3/0454 |
| 2019/0012559 | A1* | 1/2019 | Desappan ................ G06N 3/08 |
| 2019/0042935 | A1* | 2/2019 | Deisher .................. G06N 3/063 |
| 2019/0042948 | A1* | 2/2019 | Lee .......................... G06F 7/483 |
| 2019/0171927 | A1* | 6/2019 | Diril ........................ G06N 3/08 |
| 2020/0026986 | A1* | 1/2020 | Ha ....................... G06N 3/0454 |
| 2020/0285933 | A1* | 9/2020 | Zhang ...................... G06N 3/04 |

FOREIGN PATENT DOCUMENTS

| CN | 107292382 A | 10/2017 |
| CN | 108805267 A | 11/2018 |

OTHER PUBLICATIONS 201811654179.7—Office Action, dated Oct. 30, 2019, 13 pages. (no English translation).

* cited by examiner

*Primary Examiner* — Evan Aspinwall
(74) *Attorney, Agent, or Firm* — Getech Law LLC; Jun Ye (57) ABSTRACT

The invention provides a neural network quantization method and device and a related product. The neural network quantization method is used for quantizing data of a computation layer of a neural network. The technical scheme provided by the invention has the advantage of low cost.

14 Claims, 6 Drawing Sheets

NEURAL NETWORK QUANTIZATION METHOD, DEVICE AND RELATED PRODUCTS

TECHNICAL FIELD

The present disclosure relates to the field of information processing technology, and particularly relates to a neural network quantization method, device, and related products.

BACKGROUND

Neural networks have a broad and attractive prospect in the fields of system identification, pattern recognition, intelligent control, and the like. Particularly, in the field of intelligent control, people are interested in the self-learning function of neural networks, and regard this function as a key to solving the problem of controller adaptability in automatic control.

In general, existing neural network architectures are based on multi-bit architectures, such as the 32 Bit architecture commonly used at present. The existing neural network architectures occupy a large number of data bits, which requires large storage space and high processing bandwidth, thus increasing costs.

SUMMARY

Examples of the present disclosure provide a neural network quantization method and related products to reduce a number of bits of a neural network architecture, which may reduce storage space and processing bandwidth, thus reducing costs.

In a first aspect, a neural network quantization method is provided, including:

obtaining a weight and input data of a target quantization layer of an original neural network, where the target quantization layer is at least one of computation layers of the original neural network;

determining a quantization parameter of a weight of a corresponding layer by using the weight of the target quantization layer of the original neural network;

determining a quantization parameter of input data of a corresponding layer by using the input data of the target quantization layer of the original neural network;

where both the weight and the input data of the target quantization layer follow a principle of not distorting a maximum absolute value; and quantizing the target quantization layer of the original neural network according to the quantization parameter of the weight and the quantization parameter of the input data.

In a second aspect, a neural network quantization device is provided, including:

a data reading unit configured to obtain a weight and input data of a target quantization layer of an original neural network, where the target quantization layer is at least one of computation layers of the original neural network;

a quantization parameter determining unit configured to determine a quantization parameter of a weight of a corresponding layer by using the weight of the target quantization layer of the original neural network, and determine a quantization parameter of input data of the corresponding layer by using the input data of the target quantization layer of the original neural network; where both the weight and the input data of the target quantization layer follow a principle of not distorting a maximum absolute value; and a quantization unit configured to quantize the target quantization layer of the original neural network according to the quantization parameter of the weight and the quantization parameter of the input data.

In a third aspect, an electronic device is provided, including a memory, a processor, and a computer program which is stored on the memory and executable on the processor. The processor implements the method provided in the first aspect when executing the computer program.

In a fourth aspect, a computer readable storage medium is provided, on which a computer program for electronic data exchange is stored, where the computer program enables a computer to execute the method provided in the first aspect.

In a fifth aspect, a computer program product is provided, including a non-volatile computer readable storage medium product which stores a computer program, where the computer program enables a computer to execute the method provided in the first aspect.

The technical solution provided in the present disclosure performs quantization on a target quantization layer of an original neural network to obtain a quantization parameter of a weight and a quantization parameter of input data, and then completes quantization of the target quantization layer according to the quantization parameters. When a quantized target quantization layer performs an operation, since both the input data and the weight are quantized data, storage space of the weight and the input data may be reduced, thus the number of bit operations may also be reduced. To summarize, the technical solution provided in the present disclosure has advantages of reducing the amount of operations, increasing operating speed, saving storage space, reducing power consumption, and saving costs.

BRIEF DESCRIPTION OF THE DRAWINGS

To describe technical solutions in examples of the present disclosure more clearly, accompanied drawings needed in the examples of the present disclosure will be briefly described hereinafter. Apparently, the described accompanied drawings below are some examples of the present disclosure. Those of ordinary skill in the art may obtain other accompanied drawings based on the accompanied drawings without creative efforts.

DETAILED DESCRIPTION OF EXAMPLES

Technical solutions in the examples of the present disclosure will be described clearly and completely hereinafter with reference to the accompanied drawings in the examples of the present disclosure. Apparently, the described examples are merely some rather than all examples of the present disclosure. All other examples obtained by those of ordinary skill in the art based on the examples of the present disclosure without creative efforts shall fall within the protection scope of the present disclosure.

The terms such as "first", "second", "third", "fourth" and the like used in the specification, the claims, and the accompanied drawings of the present disclosure are used for distinguishing between different objects rather than describing a particular order. The terms "include" and "comprise" as well as variations thereof are intended to cover non-exclusive inclusion. For instance, a process or a method including a series of steps or a system, a product, a device, or an apparatus including a series of units is not limited to the listed steps or units, instead, it may alternatively include other steps or units that are not listed; alternatively, other steps or units inherent to the process, method, product, or device may be included.

The term "example" or "implementation" referred to herein means that a particular feature, structure, or characteristic described in conjunction with the example may be contained in at least one example of the present disclosure. The phrase appearing in various places in the specification does not necessarily refer to the same example, nor does it refer to an independent or alternative example that is mutually exclusive with other examples. It is expressly and implicitly understood by those skilled in the art that an example described herein may be combined with other examples.

Figure 1:
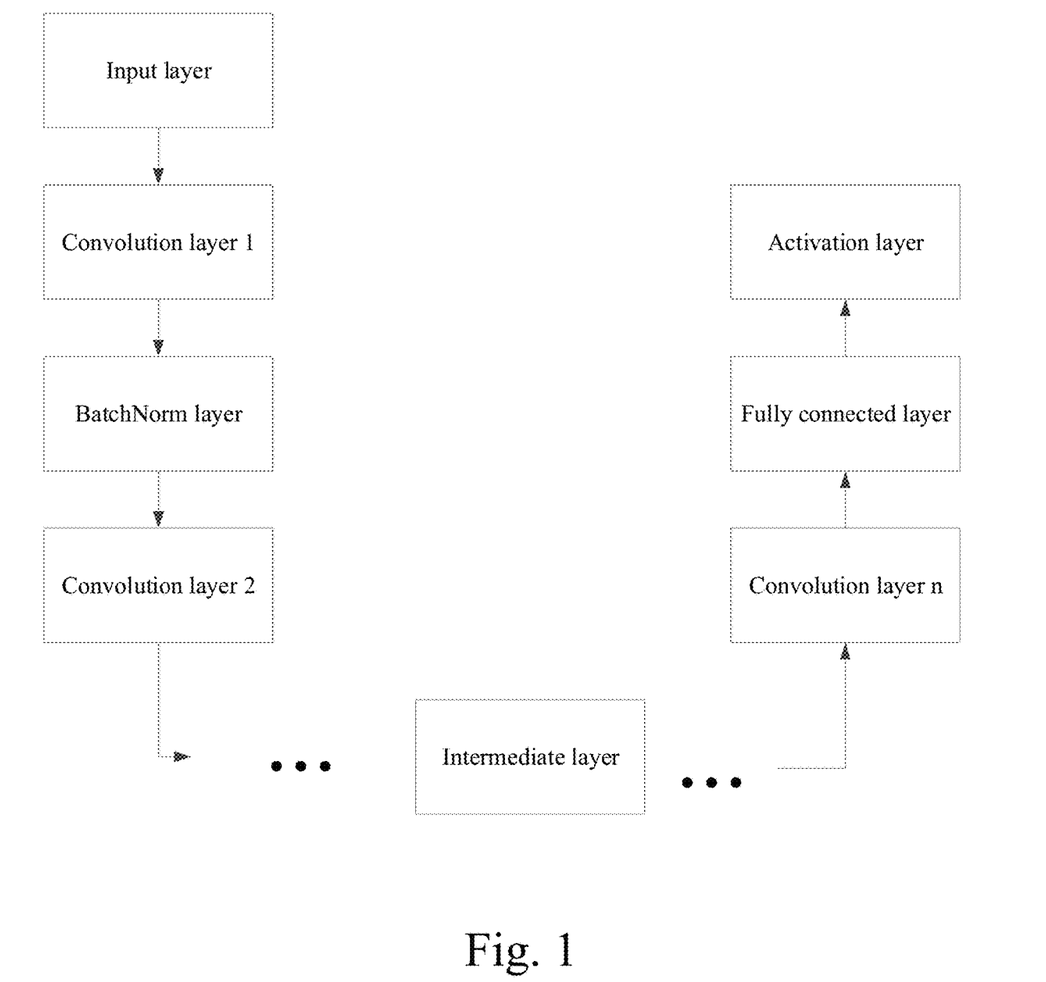
FIG. 1 is a schematic structural diagram of a neural network architecture according to an example of the present disclosure.

Referring to FIG. 1, a schematic structural diagram of a neural network architecture is provided. As shown in FIG. 1, the neural network architecture may be a multi-layer structure including an input layer, a convolution layer 1, a Batchnorm layer, a convolution layer 2, an intermediate layer (the neural network architecture has different intermediate layers according to different functions, and the intermediate layer may include at least one layer), a convolution layer n, a fully connected layer 1, and an activation (such as an activation function: Softmax) layer. For the neural network architecture, a layer with a large amount of computations can be named as a computation layer such as a convolution layer, a fully connected layer, etc. In practical applications, the computation layer may also include other types of layers. In addition, the neural network architecture in FIG. 1 provided in the present disclosure is for a purpose of illustration only, and the neural network in the present disclosure is not limited hereto.

Figure 2:
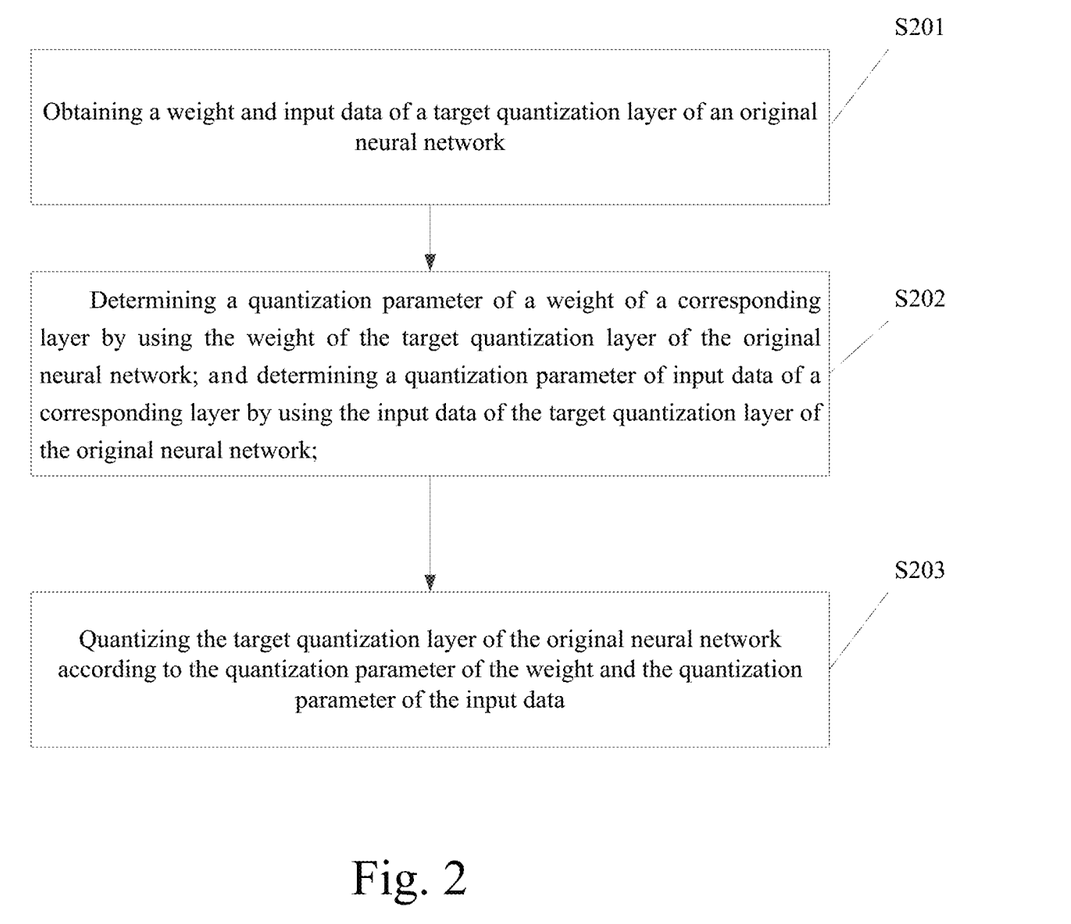
FIG. 2 is a flowchart of a neural network quantization method according to an example of the present disclosure.

Referring to FIG. 2, a neural network quantization method is provided. The method may be implemented under the neural network architecture shown in FIG. 1, or may be implemented under other neural network architectures in practical applications. A structure of the neural network architecture is not limited in the method shown in FIG. 2. The method shown in FIG. 2 may be executed by a neural network chip, or may be executed by a general-purpose chip or an electronic device including a chip in practical applications. The general-purpose chip may be a central processing unit (CPU), a graphics processing unit (GPU), and the like. The method shown in FIG. 2 includes the following steps:

a step S201: obtaining a weight and input data of a target quantization layer of an original neural network, where the target quantization layer is at least one of computation layers of the original neural network; the original neural network in the step S201 may be a known neural network, such as a trained neural network model, and the neural network model may include input data of an input layer.

The at least one layer may include one or more layers.

Optionally, the computation layer may include at least one of a convolution layer, a fully connected layer, an LRN layer, a deconvolution layer, a Reorg layer, and a Normalize layer. In practical applications, the computation layer may also include other types of layers. A specific representation of the computation layer is not limited in the present disclosure.

The method may further include:

a step S202: determining a quantization parameter of a weight of a corresponding layer by using the weight of the target quantization layer of the original neural network; and determining a quantization parameter of input data of the corresponding layer by using the input data of the target quantization layer of the original neural network;

where the step S202 follows a principle of not distorting a maximum absolute value, which means that both the weight and the input data of the target quantization layer follow the principle of not distorting the maximum absolute value.

The method may further include:

a step S203: quantizing the target quantization layer of the original neural network according to the quantization parameter of the weight and the quantization parameter of the input data.

The method for implementing the step S203 may specifically include: storing the quantization parameter of the weight and the quantization parameter of the input data in an ini configuration file of the target quantization layer. If the target quantization layer is a first layer of the neural network, the ini configuration file may further include: a mean and a variance.

The technical solution provided in the present disclosure performs quantization on a target quantization layer of an original neural network to obtain a quantization parameter of a weight and a quantization parameter of input data, and then completes quantization of the target quantization layer according to the quantization parameters. When a quantized target quantization layer performs an operation, since both the input data and the weight are quantized data, storage space of the weight and the input data may be reduced, thus the number of bit operations may also be reduced. To summarize, the technical solution provided in the present disclosure has advantages of reducing the amount of operations, increasing operating speed, saving storage space, reducing power consumption, and saving costs.

Optionally, the determining the quantization parameter of the weight of the corresponding layer by using the weight of the target quantization layer of the original neural network may specifically include:

obtaining a maximum absolute value of a weight of each target quantization layer, and determining a first quantization parameter and a second quantization parameter of a weight of the corresponding layer according to the maximum absolute value of the weight of each target quantization layer.

The maximum absolute value of the weight may specifically be: a value with the maximum absolute value among all elements of the weight. For instance, if a weight includes 5 elements whose values are $\alpha1$, $\alpha2$, $\alpha3$, $\alpha4$, and $\alpha5$ respectively, the maximum absolute value of the weight is a maximum value among $|\alpha1|$, $|\alpha2|$, $|\alpha3|$, $|\alpha4|$, and $|\alpha5|$.

Optionally, the determining the quantization parameter of the input data of the corresponding layer by using the input data of the target quantization layer of the original neural network may specifically include:

obtaining a maximum absolute value of input data of each target quantization layer; and determining a first quantization parameter and a second quantization parameter of input data of the corresponding layer according to the maximum absolute value of the input data of each target quantization layer The maximum absolute value of the input data may specifically be: a value with the maximum absolute value among all elements of the input data.

Optionally, the method may further include:

processing each target quantization layer of the original neural network by using a first quantization method, a second quantization method, or a third quantization method. Specifically, the method may include: processing a weight of each target quantization layer by using the first quantization method, the second quantization method, or the third quantization method to obtain a weight quantization result; and may further include: processing input data of each target quantization layer by using the first quantization method, the second quantization method, or the input data of each target quantization layer to obtain an input data quantization result.

The first quantization method may include: quantizing the weight of the corresponding layer by using the first quantization parameter of the weight of each target quantization layer to obtain the weight quantization result of the corresponding layer; and quantizing the input data of the corresponding layer by using the first quantization parameter of the input data of each target quantization layer to obtain the input data quantization result of the corresponding layer.

The first quantization method may specifically be:

$$fp32data = fix8data * 2^{position}$$

The fp32data may be an element value of a weight or input data. The fix8 data may be a corresponding quantization value of the element value in the weight quantization result or the input data quantization result, and position can be the first quantization parameter. An expression of the position is:

$$position = \log_2 (abs\_max)/127$$

The abs_max refers to the maximum absolute value of a weight. The fix8 data refers to 8-bit data which has 8 bits, including one sign bit, seven integer bits, and zero decimal bits. A maximum integer value is expressed as $2^7-1$, and the value assigned to abs_max is 127 when calculating the position.

The second quantization method may include:

obtaining a weight quantization intermediate parameter of the corresponding layer by using the first quantization parameter and the second quantization parameter of the weight of each target quantization layer; obtaining the weight quantization result of the corresponding layer according to the weight quantization intermediate parameter; obtaining a quantization intermediate parameter of the input data of the corresponding layer by using the first quantization parameter and the second quantization parameter of the input data of each target quantization layer; and obtaining the input data quantization result of the corresponding layer according to the quantization intermediate parameter of the input data.

The second quantization method may specifically be:

$$fp32data = fix8data/new\_scale,$$

where $new\_scale = 2^{-position} * scale$ and $scale = 127 * 2^{position}/abs\_max$.

The new_scale may be a quantization intermediate parameter, and the scale may be the second quantization parameter. When the fp32 data is an element value of the weight, the new_scale may be a weight quantization intermediate parameter; and when the fp32 data is an element value of the input data, the new_scale may be a quantization intermediate parameter of the input data.

Optionally, the third quantization method may include:

obtaining a weight quantization result of the corresponding layer by using the first quantization parameter and the second quantization parameter of the weight of each target quantization layer; and obtaining the input data quantization result of the corresponding layer by using the first quantization parameter and the second quantization parameter of the input data of each target quantization layer.

The third quantization method may specifically be:

$$fp32data = (fix8data * 2^{position})/scale$$

In practical applications of the first quantization method, the second quantization method, and the third quantization method, a chip may be selected according to actual situations. In other words, the first quantization method may be used to quantize input data of the same layer, and the second quantization method or the third quantization method may be used to quantize a weight. In practical applications, a combination of the three quantization methods may also be used. A method used for quantization of input data and a weight is not limited in the present disclosure.

Optionally, the method may further include:

obtaining a weight quantization intermediate parameter of a corresponding channel by using a first weight quantization parameter and a second weight quantization parameter of each channel of each target quantization layer, where the target quantization layers may include a convolution layer and/or a fully connected layer; obtaining a weight quantization result of a corresponding channel by using the weight quantization intermediate parameter of each channel, where the weight quantization result of each channel of each target quantization layer constitutes a weight quantization result of the corresponding layer; and obtaining a quantization intermediate parameter of the input data of a corresponding layer by using a first input data quantization parameter and a second input data quantization parameter of each target quantization layer; and obtaining an input data quantization result of the corresponding layer by using the quantization intermediate parameter of the input data of each target quantization layer.

Figure 3A:
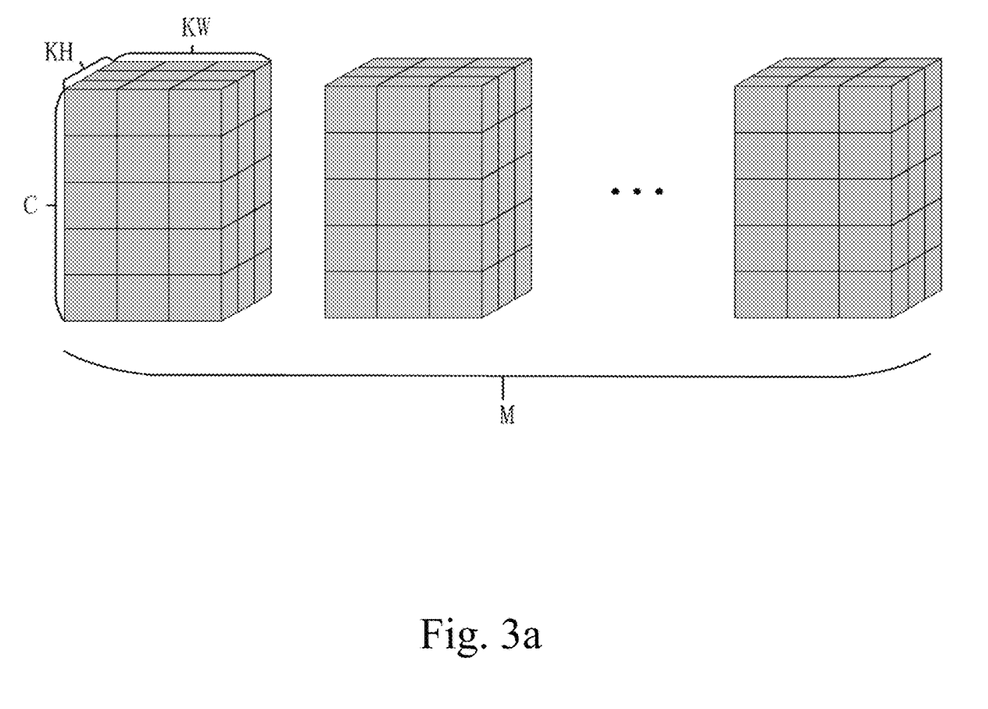
FIG. 3a is a schematic structural diagram of a weight of a convolution layer according to an example of the present disclosure.
Figure 3B:
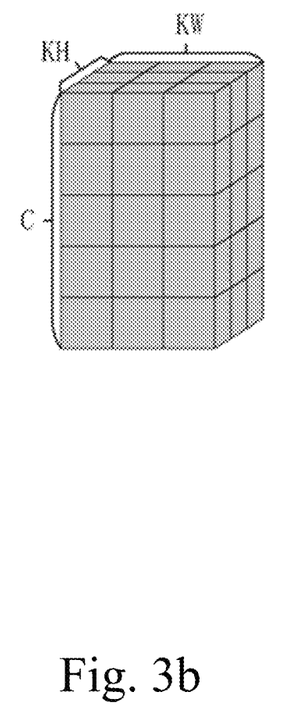
FIG. 3b is a schematic diagram showing a data structure of a channel in a weight of a convolution layer according to an example of the present disclosure.

Each channel of each target quantization layer may contain a weight of the layer or a data block of input data. For instance, if the target quantization layer is a convolution layer, the weight may be four-dimensional data M, KH, KW, and C as shown in FIG. 3a, and each channel of the convolution layer may contain a three-dimensional data block KH, KW, and C (as shown in FIG. 3b). Each data block corresponds to a position and a scale. Therefore, if a convolutional layer has n channels, the convolution layer has n data blocks, and the weight of the convolutional layer corresponds to n positions and n scales. According to $new\_scale = 2^{-position} * scale$, n new_scales may be obtained as weight quantization intermediate parameters, and then a compiler performs conversion by using the n new_scales to obtain n position' and n scale', selects a maximum value from the n position's to compensate the n scale's, and finally obtains a weight quantization result of each data block according to the following formula. The formula is:

$$fp32data = (fix8data * 2^{position'-max})/scale''$$

In the above formula, position'-max refers to the maximum value selected from the n position's, and scale" is a compensation result of the scale'.

The weight quantization result corresponding to each data block constitutes the weight quantization result of a current convolution layer. For the current convolution layer, no matter how many channels or data blocks it has, there is only one piece of input data, which corresponds to one position and one scale. According to new_scale=$2^{-position}$*scale, a new_scale may be obtained as a quantization intermediate parameter of input data. An input data quantization result may be obtained according to fp32data=fix8data/new_scale.

If the target quantization layer is a fully connected layer and/or a convolutional layer, other layers of the neural network may also be quantized by using the first quantization method, the second quantization method, or the third quantization method.

Figure 4:
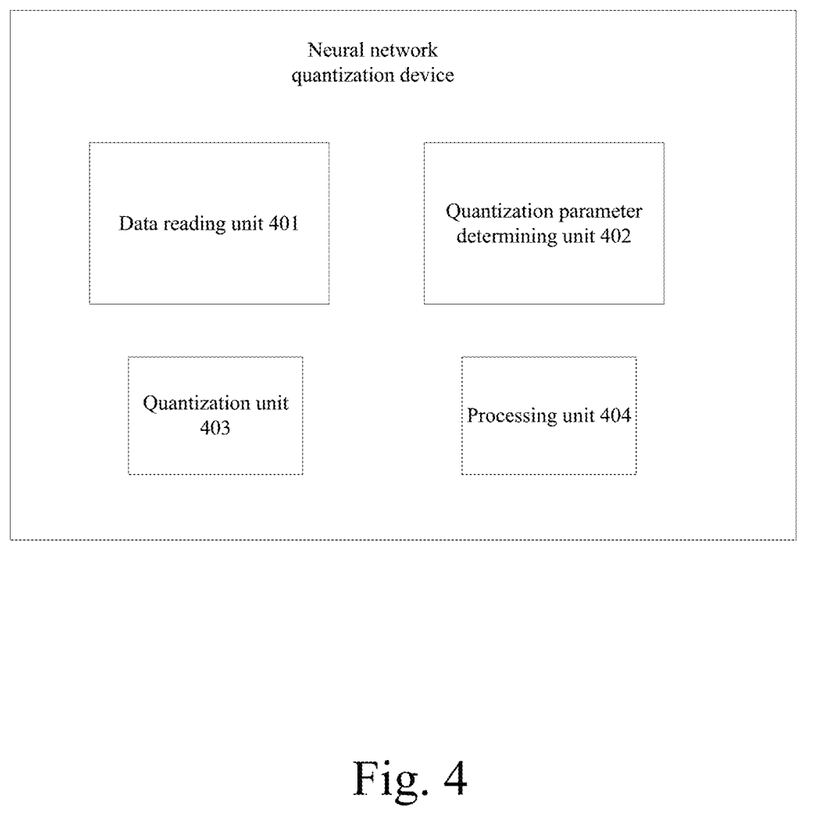
FIG. 4 is a flowchart of a quantization operating device according to an example of the present disclosure.

Referring to FIG. 4, a neural network quantization device is provided, which includes:

a data reading unit 401 configured to obtain a weight and input data of a target quantization layer of an original neural network, where the target quantization layer is at least one of computation layers of the original neural network;

a quantization parameter determining unit 402 configured to determine a quantization parameter of a weight of a corresponding layer by using the weight of the target quantization layer of the original neural network, and determine a quantization parameter of input data of the corresponding layer by using the input data of the target quantization layer of the original neural network; where both the weight and the input data of the target quantization layer follow a principle of not distorting a maximum absolute value; and a quantization unit 403 configured to quantize the target quantization layer of the original neural network according to the quantization parameter of the weight and the quantization parameter of the input data.

Optionally, the quantization parameter determining unit 402 may be specifically configured to obtain the maximum absolute value of the weight of each target quantization layer, and determine a first quantization parameter and a second quantization parameter of a weight of a corresponding layer according to a maximum absolute value of the weight of each target quantization layer.

Optionally, the quantization parameter determining unit 402 may be specifically configured to obtain the maximum absolute value of the input data of each target quantization layer, and determine the first quantization parameter and the second quantization parameter of the input data of the corresponding layer according to the maximum absolute value of the input data of each target quantization layer.

Optionally, the device may further include:

a processing unit 404 configured to process each target quantization layer of the original neural network by using a first quantization method, a second quantization method, or a third quantization method.

The first quantization method may include:

quantizing the weight of the corresponding layer by using the first quantization parameter of the weight of each target quantization layer to obtain a weight quantization result of the corresponding layer; and quantizing the input data of the corresponding layer by using the first quantization parameter of the input data of each target quantization layer to obtain a quantization result of the input data of the corresponding layer.

The second quantization method may include:

obtaining a weight quantization intermediate parameter of the corresponding layer by using the first quantization parameter and the second quantization parameter of the weight of each target quantization layer; and obtaining a weight quantization result of the corresponding layer according to the weight quantization intermediate parameter;

obtaining a quantization intermediate parameter of the input data of the corresponding layer by using the first quantization parameter and the second quantization parameter of the input data of each target quantization layer; and obtaining an input data quantization result of the corresponding layer according to the quantization intermediate parameter of the input data.

The third quantization method may include:

obtaining a weight quantization result of the corresponding layer by using the first quantization parameter and the second quantization parameter of the weight of each target quantization layer; and obtaining the input data quantization result of the corresponding layer by using the first quantization parameter and the second quantization parameter of the input data of each target quantization layer.

Optionally, the processing unit 404 may be configured to obtain a weight quantization intermediate parameter of a corresponding channel by using the first weight quantization parameter and the second weight quantization parameter of each channel of each target quantization layer, where the target quantization layer may include a convolutional layer and/or a fully connected layer;

obtaining a weight quantization result of the corresponding channel by using the weight quantization intermediate parameter of each channel, where the weight quantization result of each channel of each target quantization layer constitutes the weight quantization result of the corresponding layer;

obtaining the quantization intermediate parameter of the input data of the corresponding layer by using the first input data quantization parameter and the second input data quantization parameter of each target quantization layer; and obtaining the input data quantization result of the corresponding layer by using the quantization intermediate parameter of the input data of each target quantization layer.

Optionally, the processing unit 404 may be further configured to process each target quantization layer of the original neural network by using a first quantization method, a second quantization method, or a third quantization method. The target quantization layer may further include at least one layer other than the convolution layer and/or the fully connected layer in the computation layers of the original neural network.

The first quantization method may include:

quantizing the weight of the corresponding layer by using the first quantization parameter of the weight of each target quantization layer to obtain a weight quantization result of the corresponding layer; and quantizing the input data of the corresponding layer by using the first quantization parameter of the input data of each target quantization layer to obtain a quantization result of the input data of the corresponding layer.

The second quantization method may include:

obtaining a weight quantization intermediate parameter of the corresponding layer by using the first quantization parameter and the second quantization parameter of the weight of each target quantization layer; and obtaining a weight quantization result of the corresponding layer according to the weight quantization intermediate parameter;

obtaining a quantization intermediate parameter of the input data of the corresponding layer by using the first quantization parameter and the second quantization parameter of the input data of each target quantization layer; and obtaining an input data quantization result of the corresponding layer according to the quantization intermediate parameter of the input data.

The third quantization method may include:

obtaining a weight quantization result of the corresponding layer by using the first quantization parameter and the second quantization parameter of the weight of each target quantization layer; and obtaining an input data quantization result of the corresponding layer by using the first quantization parameter and the second quantization parameter of the input data of each target quantization layer.

For specific implementation methods of the first quantization method, the second quantization method, and third quantization method, please refer to the descriptions of the method examples shown in FIG. 2, and details will not be further described herein.

Figure 5:
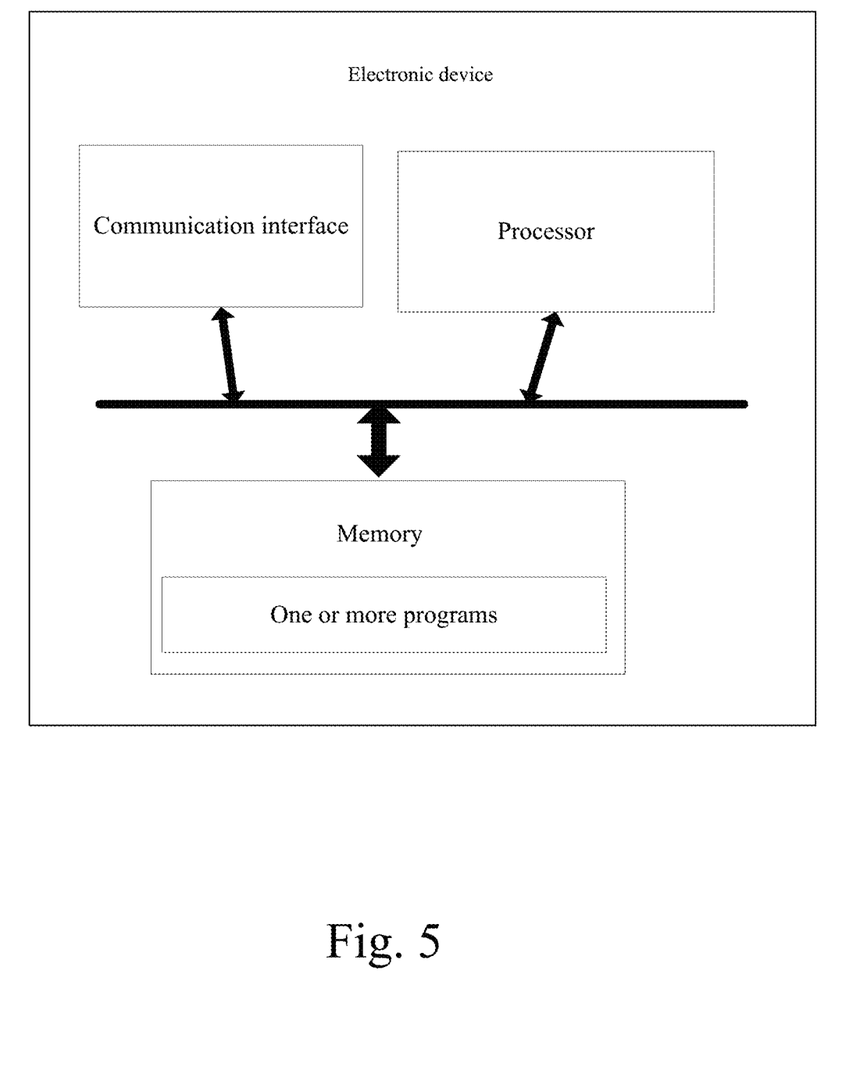
FIG. 5 is a schematic structural diagram of an electronic device according to an example of the present disclosure.

Referring to FIG. 5, an electronic device is provided, including a memory, a processor, and a computer program which is stored on the memory and executable on the processor. The processor implements the method and related details shown in FIG. 2 when executing the computer program.

The above processor may be a general-purpose processor, such as a central processing unit (CPU) and a graphics processing unit (GPU). In practical applications, the processor may also be a neural network dedicated processor, such as a pulse array machine, a machine learning processor, and the like. The processor may also be a processor combining a general-purpose processor and a neural network dedicated processor. A specific expression of the processor is not limited in the present disclosure.

The electronic device may include a data processing device, a robot, a computer, a printer, a scanner, a tablet computer, an intelligent terminal, a mobile phone, a drive recorder, a navigator, a sensor, a webcam, a server, a cloud server, a camera, a video camera, a projector, a watch, an earphone, a mobile storage, a wearable device, a transportation means, a household electrical appliance, and/or a medical device.

The transportation means may include an airplane, a ship, and/or a vehicle. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

An example of the present disclosure also provides a computer readable storage medium, on which a computer program for electronic data exchange is stored, where the computer program enables a computer to execute the method and related details shown in FIG. 2.

An example of the present disclosure also provides a computer program product, including a non-volatile computer readable storage medium which stores a computer program, where the computer program enables a computer to execute the method and related details shown in FIG. 2.

It should be noted that, for the simplicity of descriptions, all the above method examples are described as a series of action combinations. However, those skilled in the art should know that the present disclosure is not limited to the described order of actions, because according to the present disclosure, certain steps may be performed in another order or performed at the same time. Moreover, those skilled in the art should also be aware that the examples described in the specification are alternative examples and that the actions and modules involved are not necessary in the present disclosure.

In the examples, the description of each example has different emphasis. For the parts not described in detail in one example, reference may be made to related descriptions in other examples.

In the examples of the disclosure, it should be understood that the device disclosed may be implemented in other manners. For example, the described device examples are merely illustrative; for instance, division of the unit is only a logical function division and can be divided in other manners during actual implementations, for example, a plurality of units or components may be combined or integrated into another system, or some features may be ignored, or not performed. In addition, coupling or direct coupling or communication connection between each illustrated or discussed component may be indirect coupling or communication connection through some interfaces, devices or units, and may be electrical connection or other forms of connection.

The units described as separate components may or may not be physically separated and the components illustrated as units may or may not be physical units, that is, the units or the components may be in the same place or may be distributed to a plurality of network units. All or part of the units may be selected according to actual needs to achieve the purpose of the technical solutions of the examples.

In addition, functional units in various examples of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various examples of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It can be understood by those of ordinary skill in the art that all or a part of the various methods of the examples described above may be accomplished by means of a program to instruct associated hardware, and the program may be stored in a computer-readable memory, which may include a flash memory, a read-only memory (ROM), a random-access memory (RAM), a disk or a compact disc (CD), and the like.

The examples of the present disclosure are described in detail above and specific examples are used herein to describe the principle and implementation manners of the present disclosure. The description of the above examples is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A neural network quantization method, comprising:
obtaining a weight and input data of a target quantization layer of an original neural network, wherein the target quantization layer includes at least one computation layer of the original neural network;
determining a quantization parameter of a weight of a corresponding layer by using the weight of the target quantization layer of the original neural network; determining a quantization parameter of input data of a corresponding layer by using the input data of the target quantization layer of the original neural network, wherein both the weight and the input data of the target quantization layer follow a principle of not distorting a maximum absolute value; and
quantizing the target quantization layer of the original neural network according to the quantization parameter of the weight and the quantization parameter of the input data to generate a quantized weight and quantized input data.

2. The neural network quantization method of claim 1, wherein the computation layer includes at least one of a convolution layer, a fully connected layer, an LRN layer, a deconvolution layer, a Reorg layer, and a Normalize layer.

3. The neural network quantization method of claim 1, wherein the determining the quantization parameter of the weight of the corresponding layer by using the weight of the target quantization layer of the original neural network includes:
obtaining a maximum absolute value of a weight of each target quantization layer, and
determining a first quantization parameter and a second quantization parameter of the weight of the corresponding layer according to the maximum absolute value of the weight of each target quantization layer.

4. The neural network quantization method of claim 1, wherein the determining the quantization parameter of the input data of the corresponding layer by using the input data of the target quantization layer of the original neural network includes:
obtaining a maximum absolute value of input data of each target quantization layer, and
determining a first quantization parameter and a second quantization parameter of input data of the corresponding layer according to the maximum absolute value of the input data of each target quantization layer.

5. The neural network quantization method of claim 1, further comprising:
processing each target quantization layer of the original neural network by using a first quantization method, a second quantization method, or a third quantization method, wherein:
the first quantization method includes:
quantizing the weight of the corresponding layer by using a first quantization parameter of the weight of each target quantization layer to obtain a weight quantization result of the corresponding layer, and
quantizing the input data of the corresponding layer by using a first quantization parameter of the input data of each target quantization layer to obtain an input data quantization result of the corresponding layer,
the second quantization method includes:
obtaining a weight quantization intermediate parameter of the corresponding layer by using the first quantization parameter and a second quantization parameter of the weight of each target quantization layer,
obtaining the weight quantization result of the corresponding layer according to the weight quantization intermediate parameter,
obtaining a quantization intermediate parameter of the input data of the corresponding layer by using the first quantization parameter and a second quantization parameter of the input data of each target quantization layer, and
obtaining the input data quantization result of the corresponding layer according to the quantization intermediate parameter of the input data,
the third quantization method includes:
obtaining the weight quantization result of the corresponding layer by using the first quantization parameter and the second quantization parameter of the weight of each target quantization layer, and
obtaining the input data quantization result of the corresponding layer by using the first quantization parameter and the second quantization parameter of the input data of each target quantization layer.

6. The neural network quantization method of claim 1, further comprising:
obtaining a weight quantization intermediate parameter of a corresponding channel by using a first weight quantization parameter and a second weight quantization parameter of each channel of each target quantization layer, wherein the target quantization layer includes a convolution layer and/or a fully connected layer,
obtaining a weight quantization result of the corresponding channel by using the weight quantization intermediate parameter of each channel, wherein the weight quantization result of each channel of each target quantization layer constitutes a weight quantization result of the corresponding layer,
obtaining a quantization intermediate parameter of the input data of the corresponding layer by using a first input data quantization parameter and a second input data quantization parameter of each target quantization layer, and
obtaining an input data quantization result of the corresponding layer by using the quantization intermediate parameter of the input data of each target quantization layer.

7. The neural network quantization method of claim 6, further comprising:
processing each target quantization layer of the original neural network by using the first quantization method, the second quantization method, or the third quantization method, wherein the target quantization layer further includes at least one layer other than the convolution layer and/or the fully connected layer in the computation layers of the original neural network,
the first quantization method includes:
quantizing the weight of the corresponding layer by using the first quantization parameter of the weight of each target quantization layer to obtain the weight quantization result of the corresponding layer, and
quantizing the input data of the corresponding layer by using the first quantization parameter of the input data of each target quantization layer to obtain the quantization result of the input data of the corresponding layer,
the second quantization method includes:
obtaining a weight quantization intermediate parameter of the corresponding layer by using the first quantization parameter and the second quantization parameter of the weight of each target quantization layer, obtaining a weight quantization result of the corresponding layer according to the weight quantization intermediate parameter, obtaining the quantization intermediate parameter of the input data of the corresponding layer by using the first quantization parameter and the second quantization parameter of the input data of each target quantization layer, and obtaining the input data quantization result of the corresponding layer according to the quantization intermediate parameter of the input data, the third quantization method includes:

obtaining the weight quantization result of the corresponding layer by using the first quantization parameter and the second quantization parameter of the weight of each target quantization layer, and obtaining the input data quantization result of the corresponding layer by using the first quantization parameter and the second quantization parameter of the input data of each target quantization layer.

8. A neural network quantization device, comprising:

a data reading unit configured to obtain a weight and input data of a target quantization layer of an original neural network, wherein the target quantization layer is at least one computation layer of the original neural network;

a quantization parameter determining unit configured to determine a quantization parameter of a weight of a corresponding layer by using the weight of the target quantization layer of the original neural network, and determine a quantization parameter of input data of the corresponding layer by using the input data of the target quantization layer of the original neural network, wherein both the weight and the input data of the target quantization layer follow a principle of not distorting a maximum absolute value; and a quantization unit configured to quantize the target quantization layer of the original neural network according to the quantization parameter of the weight and the quantization parameter of the input data to generate a quantized weight and quantized input data.

9. The neural network quantization device of claim 8, wherein the computation layer includes at least one of a convolution layer, a fully connected layer, an LRN layer, a deconvolution layer, a Reorg layer, and a Normalize layer.

10. The neural network quantization device of claim 8, wherein:

the quantization parameter determining unit is configured to obtain a maximum absolute value of a weight of each target quantization layer, and determine a first quantization parameter and a second quantization parameter of the weight of the corresponding layer according to the maximum absolute value of the weight of each target quantization layer.

11. The neural network quantization device of claim 8, wherein:

the quantization parameter determining unit is configured to obtain a maximum absolute value of input data of each target quantization layer, and determine a first quantization parameter and a second quantization parameter of the input data of the corresponding layer according to the maximum absolute value of the input data of each target quantization layer.

12. The neural network quantization device of claim 8, further comprising:

a processing unit configured to process each target quantization layer of the original neural network by using a first quantization method, a second quantization method, or a third quantization method, wherein the first quantization method includes:

quantizing the weight of the corresponding layer by using a first quantization parameter of the weight of each target quantization layer to obtain a weight quantization result of the corresponding layer, and quantizing the input data of the corresponding layer by using a first quantization parameter of the input data of each target quantization layer to obtain a quantization result of the input data of the corresponding layer, the second quantization method includes:

obtaining a weight quantization intermediate parameter of the corresponding layer by using the first quantization parameter and a second quantization parameter of the weight of each target quantization layer, obtaining the weight quantization result of the corresponding layer according to the weight quantization intermediate parameter, obtaining a quantization intermediate parameter of the input data of the corresponding layer by using the first quantization parameter and a second quantization parameter of the input data of each target quantization layer, and obtaining an input data quantization result of the corresponding layer according to the quantization intermediate parameter of the input data, the third quantization method includes:

obtaining the weight quantization result of the corresponding layer by using the first quantization parameter and the second quantization parameter of the weight of each target quantization layer, and obtaining the input data quantization result of the corresponding layer by using the first quantization parameter and the second quantization parameter of the input data of each target quantization layer.

13. The neural network quantization device of claim 8, further comprising:

a processing unit configured to obtain a weight quantization intermediate parameter of the corresponding channel by using a first weight quantization parameter and a second weight quantization parameter of each channel of each target quantization layer, wherein the target quantization layer includes a convolutional layer and/or a fully connected layer, obtaining a weight quantization result of the corresponding channel by using the weight quantization intermediate parameter of each channel, wherein the weight quantization result of each channel of each target quantization layer constitutes a weight quantization result of the corresponding layer, obtaining a quantization intermediate parameter of the input data of the corresponding layer by using a first input data quantization parameter and a second input data quantization parameter of each target quantization layer; and obtaining an input data quantization result of the corresponding layer by using the quantization intermediate parameter of the input data of each target quantization layer.

14. The neural network quantization device of claim 13, wherein:

the processing unit is further configured to process each target quantization layer of the original neural network by using a first quantization method, a second quantization method, or a third quantization method, wherein the target quantization layer further includes at least one layer other than the convolution layer and/or the fully connected layer in the computation layers of the original neural network, wherein:

the first quantization method includes:
quantizing the weight of the corresponding layer by using the first quantization parameter of the weight of each target quantization layer to obtain the weight quantization result of the corresponding layer, and
quantizing the input data of the corresponding layer by using the first quantization parameter of the input data of each target quantization layer to obtain the quantization result of the input data of the corresponding layer, the second quantization method includes:
obtaining a weight quantization intermediate parameter of the corresponding layer by using the first quantization parameter and the second quantization parameter of the weight of each target quantization layer,
obtaining the weight quantization result of the corresponding layer according to the weight quantization intermediate parameter,
obtaining the quantization intermediate parameter of the input data of the corresponding layer by using the first quantization parameter and the second quantization parameter of the input data of each target quantization layer, and
obtaining an input data quantization result of the corresponding layer according to the quantization intermediate parameter of the input data, the third quantization method includes:
obtaining the weight quantization result of the corresponding layer by using the first quantization parameter and the second quantization parameter of the weight of each target quantization layer, and
obtaining the input data quantization result of the corresponding layer by using the first quantization parameter and the second quantization parameter of the input data of each target quantization layer.

* * * * *